United States Patent [19]
Brady et al.

[11] Patent Number: 5,579,349
[45] Date of Patent: Nov. 26, 1996

[54] CIRCUITRY FOR RESOLVING MULTIPLE ASYNCHRONOUS STATE INPUTS

[75] Inventors: Gary W. Brady, Aloha; David G. Ellis, Hillsboro, both of Oreg.

[73] Assignee: Intel Corporation, Santa Clara, Calif.

[21] Appl. No.: 85,961

[22] Filed: Jun. 30, 1993

[51] Int. Cl.$^6$ ...................................................... H04L 7/00
[52] U.S. Cl. .......................... 375/370; 375/354; 375/360; 370/91
[58] Field of Search ................................ 371/1; 375/354, 375/360, 369, 370, 372, 377; 370/91; 395/406, 84; H04C 7/00

[56] References Cited

U.S. PATENT DOCUMENTS

| | | | |
|---|---|---|---|
| 4,740,891 | 4/1988 | Kirkpatrick | 364/200 |
| 4,779,089 | 10/1988 | Theus | 340/825.5 |
| 5,373,535 | 12/1994 | Ellis et al. | 375/106 |
| 5,394,557 | 2/1995 | Ellis | 395/800 |
| 5,416,807 | 5/1995 | Brady et al. | 375/356 |
| 5,436,927 | 7/1995 | Brady et al. | 375/224 |

Primary Examiner—Kim Yen Vu
Assistant Examiner—Madeleine Anh-Vinh Nguyen
Attorney, Agent, or Firm—Blakely, Sokoloff, Taylor & Zafman

[57] ABSTRACT

A number of detection circuits, one for each source of control signal set inputs, and a high speed resolution circuit, are provided for resolving multiple control signal inputs into a single stable, predictable, and useful output signal. The detection circuits detect active control signals in the various control signal set inputs, and generate detected signals. The high speed state resolution circuit generates an output signal, conditionally changing the output state based on the detected signals and the current state being output. When deciding whether to change the output state, the high speed resolution circuit considers only the detected signals applicable to the current output state and responds accordingly, ignoring all other detected signals that are not applicable. The detection circuits and the resolution circuit are coordinated in timings, ensuring proper resolution.

29 Claims, 6 Drawing Sheets

CIRCUITRY FOR RESOLVING MULTIPLE ASYNCHRONOUS STATE INPUTS

BACKGROUND OF THE INVENTION

1. Field of the Invention

The present invention relates to the field of digital systems, in particular, digital systems having multiple state machines. More specifically, the present invention relates to a method and apparatus for resolving multiple asynchronous control signals to a stable, predictable, and useful output signal.

2. Background

In a number of digital applications, it is often necessary to resolve multiple asynchronous control signals. For example, in a data instrumentation system comprising a number of trace boards for monitoring, acquiring data and controlling a number of emulation processors operating at different speeds, it is desirable to have a signal that can be controlled by each state machine on the trace boards, and can also be sampled by the state machines. To do so, it is necessary to resolve the asynchronous control signals originating from each state machine to create this signal. Traditional prior art methods for resolving asynchronous signals typically involve synchronizing the input signals to a common clock first. Synchronizing the control signals to a predetermined common clock has the disadvantage of having a delay cost of at least two clocks for the synchronization logic. In a digital system such as a data instrumentation system where a number of data values are being acquired, this delay can represent a large lag in information from the original event that created the control signals. Additionally, to guarantee detection of all control signals, the predetermined common clock should be at least twice as fast as the fastest control signal. This places a very difficult performance requirement on the circuit and effectively limits the top operating speed. Thus, it is desirable to be able to resolve asynchronous control signals to a stable, predictable, and useful output signal without having to first synchronize all the control signals to a common clock. As will be disclosed, the present invention provides such a method and apparatus, which advantageously achieves the desirable results. As will be obvious from the descriptions to follow, the present invention has particular application to high speed data instrumentation systems.

SUMMARY OF THE INVENTION

Under the present invention, the desirable results are advantageously achieved by providing a number of control signal detection circuits, one for each source of a control signal input set, and a high speed resolution circuit. Each control signal input set comprises two control signals, SET_in and CLR_in. The control signal detection circuits are used to detect the presence of active $SET\_in_s$ and active $CLR\_in_s$ in the input sets, and in response generate active control signal detected signals, $SET\_det_s$ and $CLR\_det_s$ for the resolution circuit. The resolution circuit is used to generate an output signal, RSLVD_out, with two possible output states, ON and OFF, correctly changing the output state from ON to OFF or from OFF to ON, based on the received $SET\_det_s$ and $CLR\_det_s$ signals and the current state being output, i.e. ON or OFF. When deciding whether to change the output state from ON to OFF, the resolution circuit considers only the $CLR\_det_s$ signals, ignoring the $SET\_det_s$ signals, whereas when deciding whether to change the output state from OFF to ON, the resolution circuit considers only the $SET\_det_s$ signals, ignoring the $CLR\_det_s$ signals. Additionally, after changing the output state from ON to OFF or from OFF to ON, the resolution circuit waits until the change triggering $CLR\_det_s$ or $SET\_det_s$ signals have all been deasserted before considering the $SET\_det_s$ or $CLR\_det_s$.

The durations of the $SET\_det_s$ and $CLR\_det_s$ signals are coordinated with the operating speed of the resolution circuit. More specifically, the detection circuits maintain the $SET\_det_s$ and $CLR\_det_s$ signals for sufficiently long durations to ensure the resolution circuit will have enough time to respond to the detected $SET\_det_s$ and $CLR\_det_s$ signals. In the presently preferred embodiment, the detection circuits are flip-flop based. The $SET\_det_s$ and $CLR\_det_s$ signals are generated by setting the flip flops using active $SET\_in_s$ and $CLR\_in_s$ signals. The timing coordinations between the detection circuits and the resolution circuit are achieved by clearing the flip flops using two common feedback signals, SET_sum_fb and CLR_sum_fb. The SET_sum_fb and CLR_sum_fb signals are generated by the resolution circuit by summing the received SET_det and CLR_det signals.

BRIEF DESCRIPTION OF THE DRAWINGS

The objects, features, and advantages of the present invention will be apparent from the following detailed description of the presently preferred and alternate embodiments of the invention with references to the drawings in which.

DETAILED DESCRIPTION PRESENTLY PREFERRED AND ALTERNATE EMBODIMENTS

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
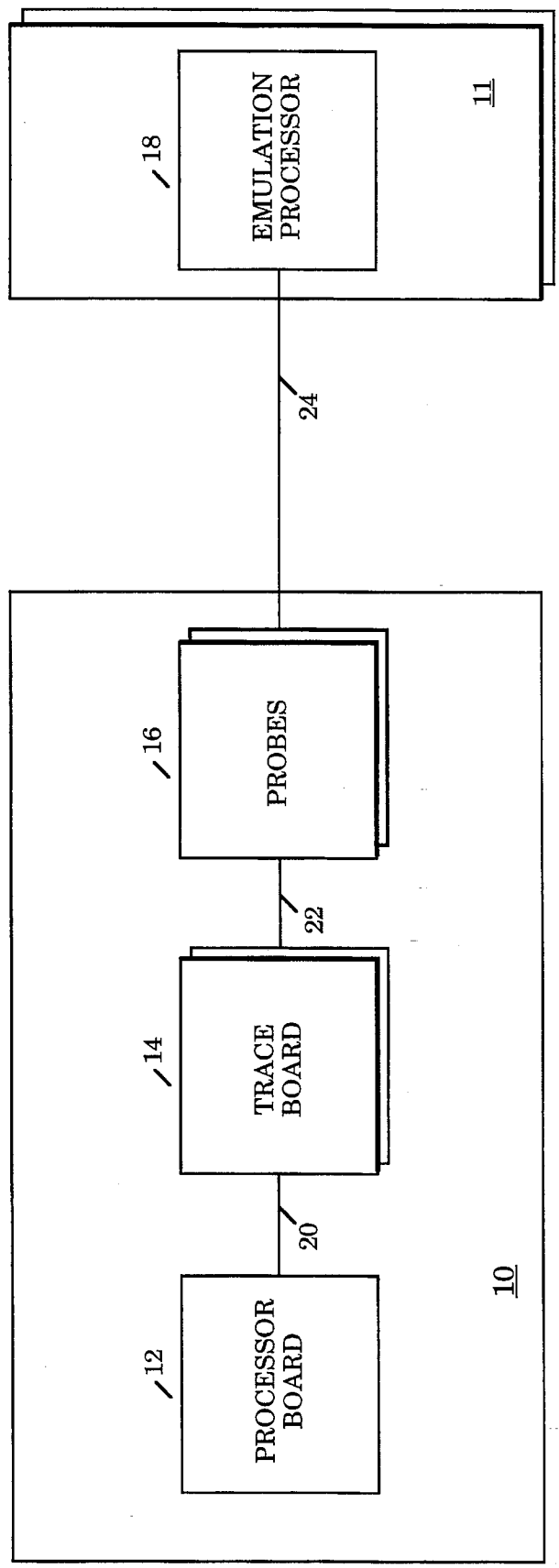
FIG. 1 illustrates an exemplary high speed data instrumentation system incorporating the teachings of the present invention.

Referring now to FIG. 1, a block diagram illustrating an exemplary data instrumentation system incorporating the teachings of the present invention is shown. Shown is an exemplary data instrumentation system 10 incorporating the teachings of the present invention coupled to a number of target systems 11 for monitoring, acquiring data, and controlling the target systems 11. The exemplary data instrumentation system 10 comprises a processor board 12 and a number of trace boards 14, incorporated with the teachings of the present invention. The exemplary data instrumentation system 10 further comprises a number of probes 16. The target systems 11 comprise a number of emulation processors 18 operating at different speeds. The processor board 12 is coupled to the trace boards 14, for example, through a parallel bus 20. The trace boards 14 are coupled to the probes 16, for example, through a number of parallel cables 22. The probes 16 are in turn coupled to the emulation processors 18.

The relevant portions of the processor board 12 and the trace boards 14 will be described below in further detail with additional references to the remaining figures. Otherwise, the processor board 12, the probes 16, and the emulation processors 18 are intended to represent a broad category of these elements found in many data instrumentation and target systems. Their constitutions and functions are well known and will not be further described. Similarly, tile trace boards 12 are intended to represent a broad category of trace boards, including but not limited to the trace board described in copending U.S. patent applications, Ser. No. 08/040,902, entitled Method and Apparatus For Resynchronizing Data Slices With Variable Skews, and Ser. No. 08/040,901, entitled Method and Apparatus For Synchronizing Periodic Sync Pulse Generations By A Number Of Remote High Speed Circuits, both assigned to assignee of the present invention, which are hereby fully incorporated by reference. Their constitutions and functions will not be further described. While the present invention is being described with a data instrumentation system, based on the description to follow, it will be appreciated that the present invention may be practiced with other digital systems, such as a microprocessor based computer system.

Figure 2:
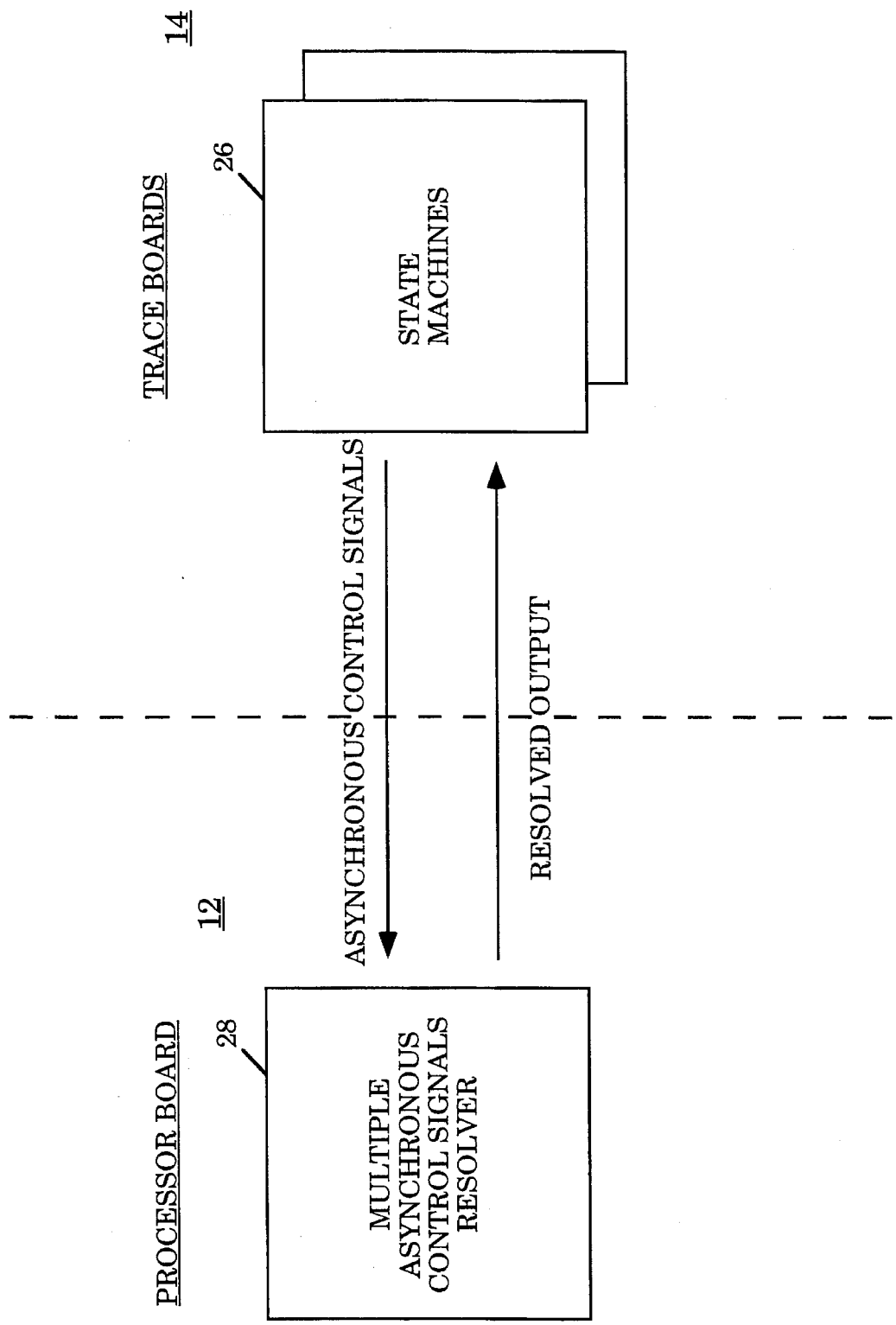
FIG. 2 illustrates the relevant portions of the processor and trace boards of FIG. 1 in further detail.

Referring now to FIG. 2, a block diagram illustrating the relevant portions of the processor and trace boards of FIG. 1 in further detail is shown. The trace boards 14 comprise a number of state machines 26 asynchronously generating a number of control signal sets. Each state machine 26 generates one or more set of control signals. The processor board 12 comprises the multiple asynchronous control signals resolver 28 of the present invention resolving the asynchronous control signals, and generating a stable, predictable, and useful output signal for the state machines 26. The multiple asynchronous control signals resolver 28 will be described in further detail with additional references to the remaining figures. The state machines 26 are intended to represent a broad category of state machines found in digital systems; Their constitutions and functions are well known and will not be further described. While the present invention is being described with the multiple asynchronous control signals resolver being disposed on the processor board, it will be appreciated that the present invention may be practiced with the multiple asynchronous control signals resolver being disposed in other convenient locations of the data instrumentation system.

Figure 3:
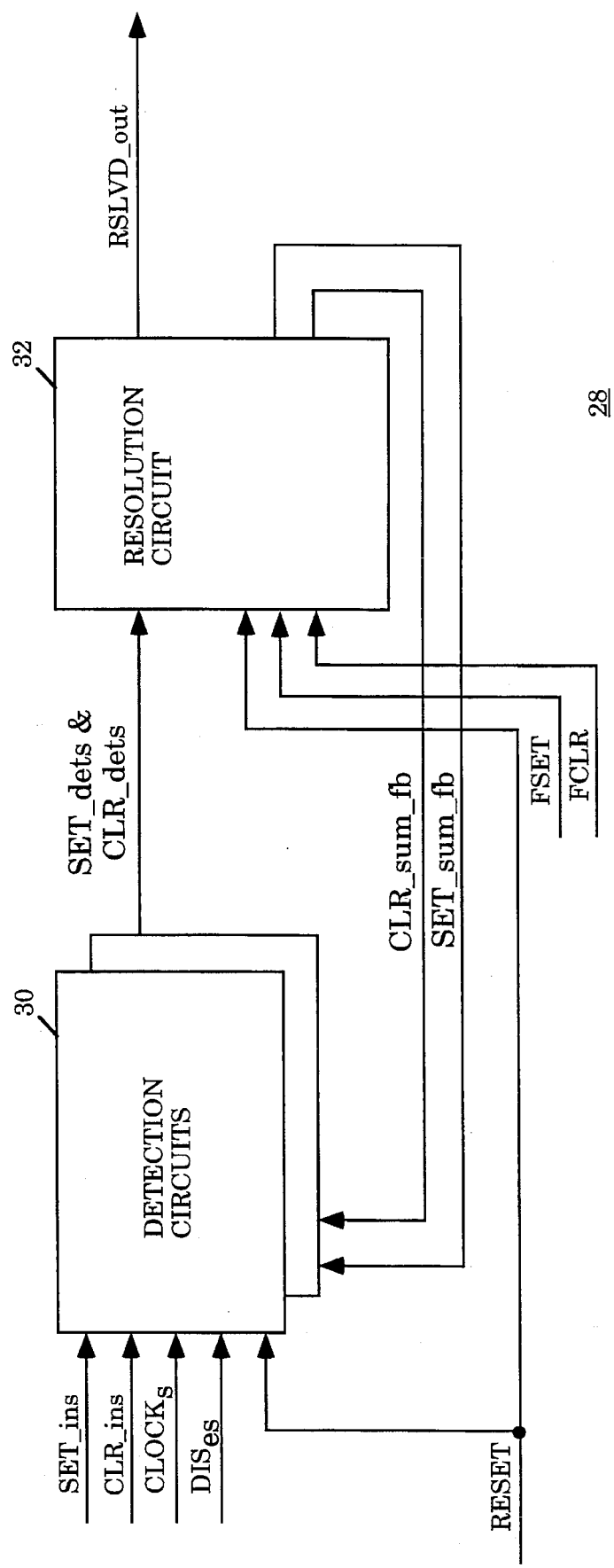
FIG. 3 illustrates the multiple asynchronous control signals resolver of the present invention in further detail.

Referring now to FIG. 3, a block diagram illustrating the multiple asynchronous control signals resolver of the present invention in further detail is shown. The multiple asynchronous control signals resolver 28 of the present invention comprises a number of identical control signal detection circuits 30, one for each source of a control signals set, and a high speed resolution circuit 32 coupled to the detection circuits 30. Each control signal set comprises two control signals (SET_in and CLR_in). The control signal detection circuits 30 are used to detect the presence of active SET_in$_s$ and active CLR_in$_s$ in the input sets, and in response generate active control signal detected signals, SET_det$_s$ and CLR_det$_s$ for the resolution circuit 32. The resolution circuit 32 is used to generate an output signal, RSLVD_out, with two possible output states, ON and OFF, correctly changing the output state from ON to OFF or from OFF to ON, based on the received SET_det$_s$ and CLR_det$_s$ signals and the current state being output, i.e. ON or OFF. When deciding whether to change the output state from ON to OFF, the resolution circuit 32 considers only the CLR_det$_s$ signals, ignoring the SET_det$_s$ signals, whereas when deciding whether to change the output state from OFF to ON, the resolution circuit 32 considers only the SET_det$_s$ signals, ignoring the CLR_det$_s$ signals. Additionally, after changing the output state from ON to OFF or from OFF to ON, the resolution circuit 32 waits until the change triggering CLR_det$_s$ or SET_det$_s$ signals have all been deasserted before considering the SET_det$_s$ or CLR_det$_s$.

The durations of the SET_det$_s$ and CLR_det$_s$ signals are coordinated with the operating speed of the resolution circuit 32. More specifically, the detection circuits 30 maintain the SET_det$_s$ and CLR_det$_s$ signals for sufficiently long durations to ensure the resolution circuit 32 will have enough time to respond to the detected SET_det$_s$ and CLR_det$_s$ signals. In the presently preferred embodiment, the detection circuits 30 are flip-flop based. The SET_det$_s$ and CLR_det$_s$ signals are generated by setting the flip flops using active SET_in$_s$ and CLR_in$_s$ signals. The timing coordinations between the detection circuits 30 and the resolution circuit 32 are achieved by clearing the flip flops using two common feedback signals, SET_sum_fb and CLR_sum_fb. The SET_sum_fb and CLR_sum_fb signals are generated by the resolution circuit 32 by summing the received SET_det and CLR_det signals.

Figure 4:
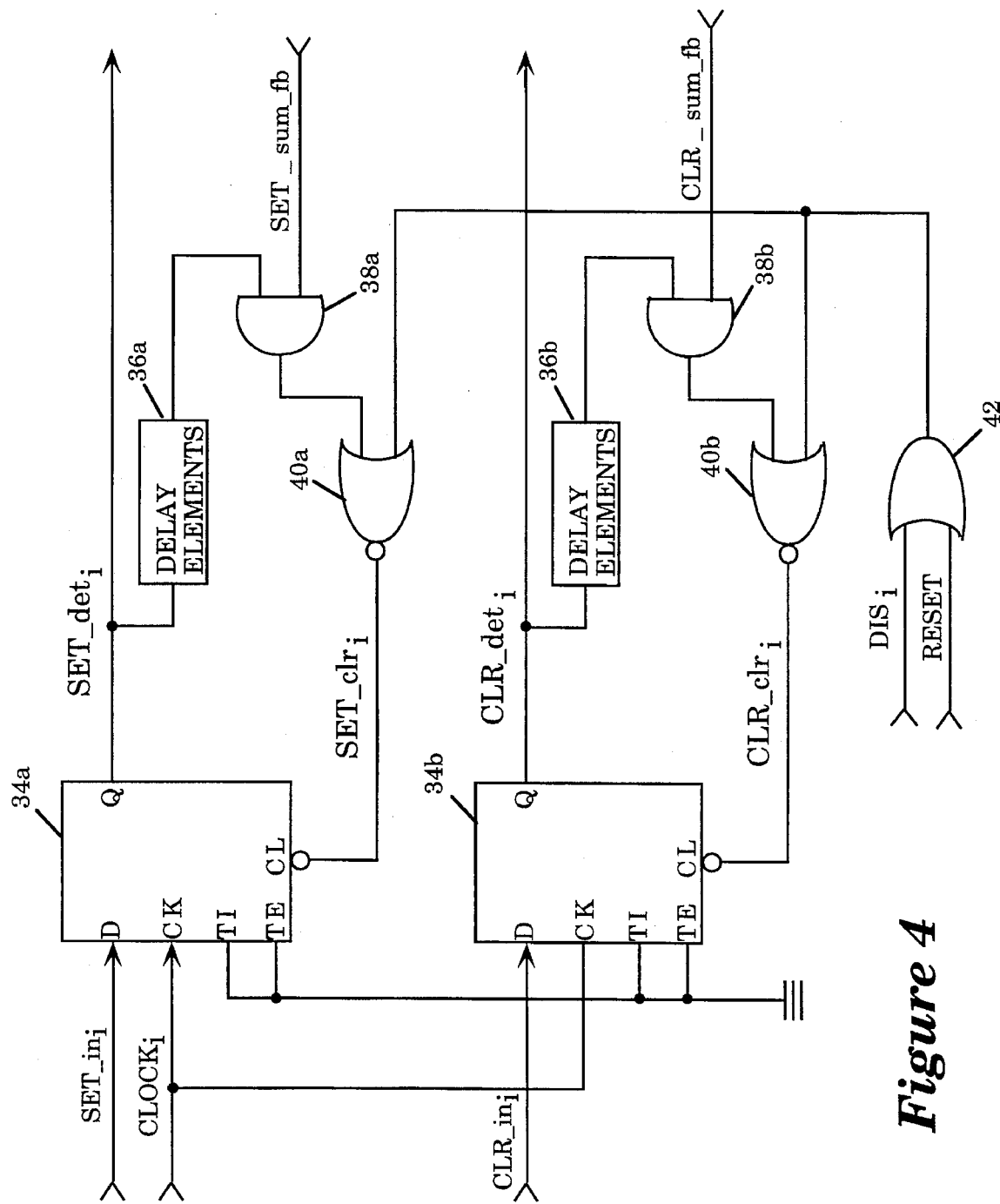
FIG. 4 illustrates the detection circuit of the present invention in further detail.

Referring now to FIG. 4, a block diagram illustrating the detection circuit of the present invention in further detail is shown. The detection circuit 30\* comprises two rising edge flip flops 34a–34b, two series of delay elements 36a–36b, two AND gates 38a–38b, and two NOR gates 40a–40b, serially coupled to each other in two circular loops. The AND gates 38a–38b are also coupled to the resolution circuit. Additionally, the detection circuit 30\* further comprises an OR gate 42 coupled to the NOR gates 40a–40b. The flip flops 34a–34b are used to detect active SET_in and CLR_in control signals and generate SET_det and CLR_det signals respectively. The AND gates 38a–38b and the NOR gates 40a–40b, in conjunction with delay elements 36a–36b, the resolution circuit, and the OR gate 42, are used to reset the flip flops 34a–34b.

Each flip flop 34a or 34b receives either the SET_in or the CLR_in signal at its D input, and in response, generates an active Q output (SET _det or CLR _det) whenever an active input is detected at its D input at a rising edge of a clock pulse (and active low is not asserted at CL). Note that the clock inputs to the flip flops 34a and 34b of the various detection circuits 30\* are not synchronized. Each series of delay elements 36a or 36b receives either an active SET _det or CLR _det as input and applying sufficient amount of delay to the SET _det or CLR _det signals to ensure the flip flop's CLK to CLR time is maintained. Each AND gate 38a or 38b receives either the delayed SET_det or CLR_det, and either a SET _sum _fb or a CLR_sum _fb signal from the resolution circuit as inputs, and outputs the logical AND of the received inputs. The SET_Sum_fb and CLR_sum_fb signals ensure the SET_det and CLR_det signals are maintained for durations sufficiently long for the resolution circuit to respond to them. The SET _sum_fb and CLR_sum_fb signals will be described in further detail below. Each NOR gate 40a or 40b receives one of the logical AND outputs as input, and generates an active low for the CL input of one of the flip flops 34a–34b, whenever the input equals logic one. Each NOR gate 40a or 40b also receives the logical OR output of the OR gate 42, which is generated based on the values of a DIS and a RESET signal. The DIS signal forcibly resets the flip flops 34a–34b of the particular detection circuit 30*, whereas the RESET signal forcibly resets the flip flops 34a–34b of all detection circuits 30.

Figure 5:
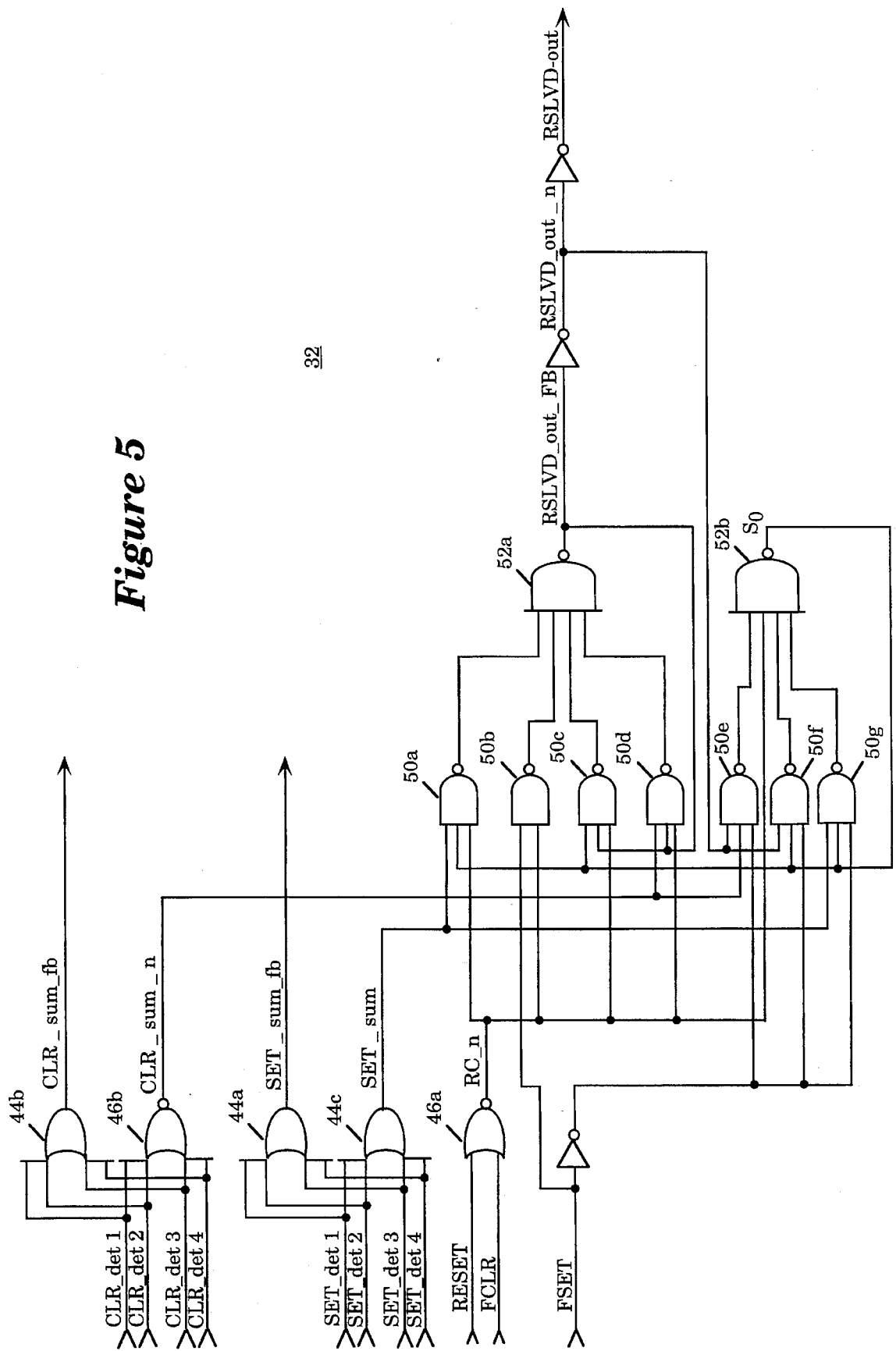
FIGS. 5, 6a and 6b illustrate the resolution circuit of the present invention in further detail.
Figures 6A, 6B:
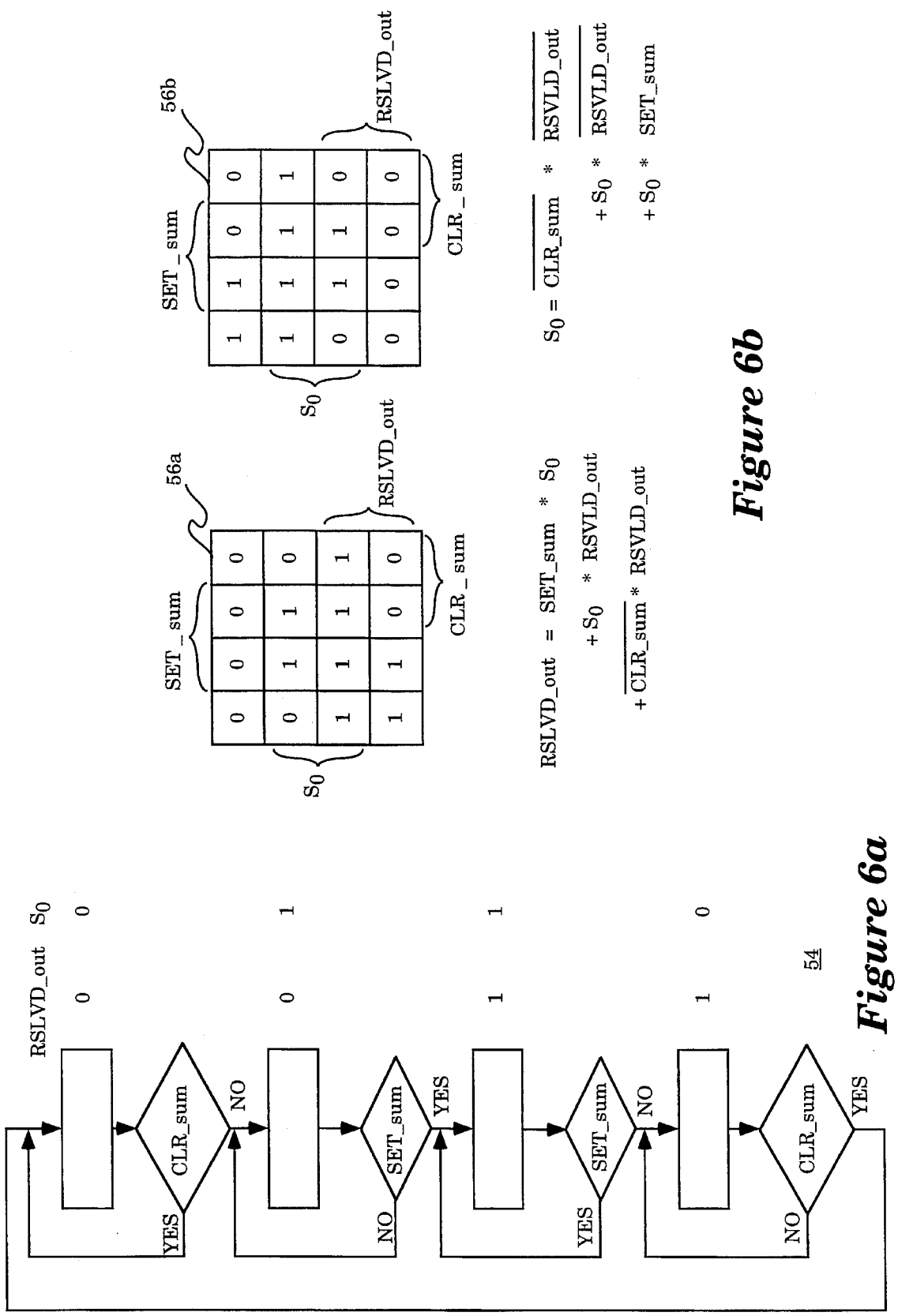

Referring now to FIGS. 5,6a and 6b two diagrams illustrating the resolution circuit of the present invention in further detail are shown. The resolution circuit 32 comprises three OR gates 44a –44c, two NOR gates 46a–46b and, and two stages of NAND gates 50a–50g and 52a–52b. The first stage of NAND gates comprises seven NAND gates 50a–50g, whereas the second stage of NAND gates comprises two NAND gates 52a–52b. The second NOR gate 46b and the third OR gate 44c are coupled to the two stages of NAND gates 50a–50g and 52a–52b. The first and second OR gates 44a–44b are used to generate the SET_sum_fb and CLR_sum_fb signals, as a way to allow the detection circuits to determine they have maintained the SET_det and CLR_det signals sufficiently long for the resolution circuit 32 to respond to them. The third OR gate 44c and the second NOR gate 46b are used to generate the consolidated SET detection signals (SET_sum) and the complement of the consolidated CLR detection signal (CLR_sum_n) for the first stage of NAND gates 50a–50g respectively. The first NOR gate 46a is used to force set the first and second stage of NAND gates 50a–50g and 52a–52b. The two stages of NAND gates 50a–50g and 52a–52b are used to generate the stable, predictable, and useful output signal RSLVD_out, with two possible output states, ON (logic one) and OFF (logic zero).

Each OR gate 44a, 44b or 44c or the second NOR gate 46b receives either the SET_det or the CLR_det signals from the detection circuits as inputs, and generates the logical OR or the logical NOR of its inputs (SET_sum_fb, CLR_sum_fb, SET_sum, and CLR_sum_n). The first NOR gate 46a receives a RESET and a FCLR signal as inputs, and generates the logical NOR of its inputs (RC_n). The RESET, FCLR and the FSET signals are used to force set the first and second stage of NAND gates 50a–50g and 52a–52b. The RESET, FCLR, and FSET signals will be described in further detail later. The first stage of NAND gates 50a–50g receives, SET_sum, CLR_sum_n, RC_n and FSET as inputs, and in conjunction with the second stage of NAND gates 52a–52b, generate RSLVD_out. The manner in which the two stages of NAND gates 50a–50g and 52a–52b generate RSLVD_out will be discussed in further detail below. While the present invention is being described with the OR gates 44a–44c, and the second NOR gate 46b receiving SET_in and CLR_in signals from four detection circuits, it will be appreciated that the present invention may be practiced with more or less detection circuits.

The state flow diagram and the two Karnaugh maps in FIG. 6 illustrate in further detail the manner in which the two stages of NAND gates 50a–50g and 52a–52b generate RSLVD_out. The two stages of NAND gates have four states governed by the values of the signals RSLVD_out and SO, i.e. {0,0},{0, 1,1}, and {1,0}. The values of RSLVD_out and SO are determined based on the two boolean equations shown, i.e.

$$RSLVD\_out=SET\_sum*SO+SO*RSLVD\_out+<CLR\_sum>*RSLVD\_out$$

$$SO=<CLR\_sum>*<RSLVD\_out>+SO*<RSLVD\_out>+SO*SET\_sum$$

where <CLR_sum> denotes the complement of CLR_sum, and <RSLVD_out> denotes the complement of RSLVD_out.

Note that <CLR_sum> is the same as CLR_sum_n. The two Karnaugh maps shown 56a—56b are alternative expressions of the two boolean equations.

Thus, at state {0,0}, RSLVD_out will remain equal to 0(OFF), whereas since SO =<CLR_sum>, SO will remain equal to 0 until CLR_sum becomes inactive. In other words, the two stages of NAND gates enter state {0,1} from state {0,0} when CLR_sum becomes inactive. At state {0,1}, SO will remain equal to 1, whereas since RSLVD_out =SET_sum, RSLVD_out will remain equal to 0 (OFF) until SET_sum becomes active. In other words, the two stages of NAND gates enter state {1,1} from state {0,1} when SET_sum becomes active. At state {1,1}, RSLVD_out will remain equal to 1 (ON), whereas since SO= SET_sum, SO will remain equal to 1 until SET_sum becomes inactive. In other words, the two stages of NAND gates enter state {1,0} from state {1,1} when SET_sum becomes inactive. At state {1,0}, SO will remain equal to 0, whereas since RSLVD_out =<CLR_sum>, RSLVD_out will remain equal to 1 (ON) until CLR_sum becomes active. In other words, the two stages of NAND gates enter state {0,0} from state {1,0} when CLR_sum becomes active.

Therefore, the two stages of NAND gates effectively consider only the SET_det signals when RSLVD_out is OFF, and consider only the CLR_det signals when RSLVD_out is ON. Additionally, upon changing the output state to OFF, the two stages of NAND gates wait until the triggering CLR_det signals have all been deasserted before considering the SET_det signals, and upon changing the output state to ON, the two stages of NAND gates wait until the triggering SET_det signals have all been deasserted before considering the CLR_det signals.

Lastly, the RESET and FCLR signals described earlier are used to force the two stages of NAND gates into state {0,1}, whereas the FSET signal described earlier is used to force the two stages of NAND gates into state {1,0}. In this embodiment, the RESET and FCLR signals take precedence over the FSET signal.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a digital system comprising a plurality of state machines asynchronously generating a plurality of control signal sets, each state machine generating at least one set of control signals and each of said control signal sets having two control signals, an apparatus for resolving said plurality of control signal sets into an output signal having two possible output states, said apparatus comprising:

a) detection means coupled to said state machines for receiving said plurality of control signal sets, detecting active control signals in said received plurality of control signal sets, and generating a plurality of detection signal sets corresponding to said control signal sets, each of said plurality of detection signal sets having two detection signals corresponding to the two control signals of one of said plurality of control signal sets for identifying active control signals being detected in the corresponding control signal set; and b) resolution means coupled to said detection means and said state machines for receiving said plurality of detection signal sets, and generating said output signal based on the current state of said output signal and selected ones of said received detection signals that are applicable to the current state of said output signal.

2. The apparatus as set forth in claim 1, wherein, said detection means comprises a plurality of detection circuits coupled to said state machines and to said resolution means, each of said detection circuits receiving one of said plurality of control signal sets from its coupled state machine, detecting active control signals in said received one of said plurality of control signal sets, and generating one of said plurality of detection signal sets.

3. The apparatus as set forth in claim 2, wherein, said detection circuits further receive a common feedback signal set from said resolution means, said common feedback signal set having two feedback signals, one feedback signal for each control signal of a control signal set;

said detection circuits further base said generation of said plurality of detection signal sets on said common feedback signal set.

4. The apparatus as set forth in claim 3, wherein, said two control signals of each of said plurality of control signal sets comprise a SET_in control signal, and a CLR_in control signal;

said two corresponding detection signals of each of said plurality of detection signal sets comprise a SET detection signal (SET_det), and a CLR detection signal (CLR_det);

said two output states of said output signal comprise an ON (logic one) state and an OFF (logic zero) state;

said two feedback signals of said common feedback signal set comprise a SET feedback signal (SET_sum_fb) and a CLR feedback signal (CLR_sum_fb); and each of said detection circuits comprises:

a.1) a SET and a CLR flip flop coupled to one of said state machines and to said resolution means for respectively receiving a SET_in signal and a SET reset signal, and a CLR_in signal and a CLR reset signal as inputs, and generating a SET_det and a CLR_det signal based on the received inputs;

a.2) a SET and a CLR reset generation circuit correspondingly coupled to said SET and CLR flip flops and to said resolution means for respectively receiving the SET_det signal and said SET_sum_fb signal, and the CLR$_{13}$ det signal and said CLR_sum_fb signal as inputs, and generating the SET and the CLR reset signals for said SET and CLR flip flops based of the received inputs after delaying a predetermined amount of time, said predtermined amount of time being sufficiently long to maintaim a clock to cleat time of said SET and CLR flip flops.

5. The apparatus as set forth in claim 4, wherein, said SET reset generation circuit of each of said detection circuits comprises:

a.2.1.1) a series of SET delay elements coupled to the SET flip flop for receiving the SET_det signal, applying said predetermined amount of delay, and outputting a delayed SET_det signal; and a.2.1.2) a SET gate assembly coupled to said series of SET delay elements, the SET flip flop, and said resolution means for receiving the delayed SET_det signal and said SET_sum_fb signal, and outputting the SET reset signal for the SET flip flop;

said CLR reset generation circuit of each of said detection circuits comprises:

a.2.2.1) a series of CLR delay elements coupled to the CLR flip flop for receiving the CLR_det signal, applying said predetermined amount of delay, and outputting a delayed CLR_det signal; and a.2.2.2) a CLR gate assembly coupled to said series of CLR delay elements, the CLR flip flop, and said resolution means for receiving the delayed CLR_det signal and said CLR_sum_fb signal as inputs, and outputting the CLR reset signal for the CLR flip flop based on the received inputs.

6. The apparatus as set forth in claim 5, wherein, said SET gate assembly of said SET reset generation circuit of each of said detection circuits comprises:

a.2.1.2.1) a SET AND gate coupled to said series of SET delay elements and said resolution means for receiving the delayed SET_det signal and said SET_sum_fb signal as inputs, performing a logical AND operation on its inputs, and outputting the result of the logical AND operation as a SET intermediate output; and a.2.1.2.2) a SET NOR gate coupled to said SET AND gate for receiving the SET intermediate output and a force reset control signal as its inputs, performing a logical NOR Operation on its inputs, and outputting the result of the logical AND operation as the SET reset signal for the SET flip flop;

said CLR gate assembly of said CLR reset generation circuit of each of said detection circuits comprises:

a.2.2.2.1) a CLR AND gate coupled to said series of CLR delay elements and said resolution means for receiving the delayed CLR_det signal and said CLR_sum_fb signal as inputs, performing a logical AND operation on its inputs, and outputting the result of the logical AND operation as a CLR intermediate output; and a.2.2.2.2) a CLR NOR gate coupled to said CLR AND gate for receiving the CLR intermediate output and said force reset control signal as its inputs, performing a logical NOR Operation on its inputs, and outputting the result of the logical NOR operation as the CLR reset signal for the CLR flip flop.

7. The apparatus as set forth in claim 1, wherein, said resolution means comprises:

b.1) a gate assembly coupled to said detection means for receiving said plurality of detection signal sets, and generating a set of two summation signals summing said plurality of detection signal sets; and b.2) a resolution circuit coupled to said gate assembly and said state machines for receiving said two summation signals, and generating said output signal based on the current state of said output signal and selected ones of said two summation signals that are applicable to the current state of said output signal.

8. The apparatus as set forth in claim 7, wherein, said gate assembly further generates a set of two feedback signals for said detection means, said detection means further base said generation Of said plurality of detection signal sets on said set of two feedback signals.

9. The apparatus as set forth in claim 8, wherein, said two control signals of each of said plurality of control signal sets comprise a SET_in signal, and a CLR_in signal;

said two corresponding detection signals of each of said plurality of detection signal sets comprise a SET detection signal (SET_det), and a CLR detection signal (CLR_det); and an OFF (logic zero) state;

said two summation signals comprise an uncomplemented SET summation signal (SET_sum) and a complemented CLR summation signal (CLR_sum_n);

said two feedback signals comprise a SET feedback signal (SET_sum_fb) and a CLR feedback signal (CLR_sum_fb), which are the summations of said SET_det and CLR_det signals;

said gate assembly comprises,
- b.1.1) a first SET OR gate and a CLR NOR gate coupled to said detection means and said resolution circuit for receiving said plurality of SET_det and CLR_det signals, performing a logical OR operation on said received SET_der signals and a logical NOR operation on said received CLR_det signals respectively, and generating the result of the logical OR operation as said SET_sum signal and the result of the logical NOR operation as said CLR_sum_n signals respectively, and
- b.1.2) a second SET OR gate and a CLR OR gate coupled to said detection means and said resolution circuit for receiving said plurality of SET and CLR detection signals, performing logical OR operations on said received SET and CLR detection signals, and generating the results of the logical OR operations as said SET_sum_fb and CLR_sum_fb signals;

said resolution circuit comprises a plurality of NAND gates for receiving said SET_sum and CLR_sum_n signals, and generating said output signal based on the current state of said output signal and selected ones of said SET_sum and CLR_sum_n signals that are applicable to the current state of said output signal.

10. The apparatus as set forth in claim 9, wherein, said output signal (RSLVD_out) being in the ON state when RSLVD_out=1 and in the OFF state when RSLVD_out=0;

said plurality of NAND gates have an internal signal (SO);

said plurality of NAND gates collectively have four states governed by the current values of said output signal (RSLVD_out) and said internal signal (SO), said four states being {RSLVD_out=0,SO=0},{RSLVD_out=0, SO=1}, {RSLVD_out =1,SO=1}, and {RSLVD_out= 1, SO=0};

said plurality of NAND gates determine the current values of RSLVD_out and SO in accordance to a first and a second boolean equation, said first boolean equation being $RSLVD\_out=SET\_sum*SO+SO*RSLVD\_out+CLR\_sum\_n* RSLVD\_out$, and said second boolean equation being $SO=CLR\_sum\_n* <RSLVD\_out>+SO*<RSLVD\_out>+SO* SET\_sum$, where $<RSLVD\_out>$ is the complement of the current value of said RSLVD_out signal.

11. In a digital system comprising a plurality of state machines asynchronously generating a plurality of control signal sets, each of said state machines generating at least one set of control signals and each of said control signal sets having two control signals, a method for resolving said plurality of control signal sets into an output signal having two possible output states said method comprising the steps of:

a) receiving said plurality of control signal sets, detecting active control signals in said received plurality of control signal sets, and generating a plurality of detection signal sets corresponding to said control signal sets, each of said plurality of detection signal sets having two detection signals corresponding to the two control signals of one of said plurality of control signal sets for identifying active control signals being detected in the corresponding control signal set; and b) receiving said plurality of detection signal sets, and generating said output signal based on the current state of said output signal and selected ones of said received detection signals of said plurality of detection signal sets that are applicable to the current state of said output signal.

12. The method as set forth in claim 11, wherein, said step a) being performed using a plurality of detection circuits coupled to said state machines, each of said detection circuits receiving one of said plurality of control signal sets from its coupled state machine, detecting active control signals in said received one of said plurality of control signal sets, and generating one of said plurality of detection signal sets.

13. The method as set forth in claim 12, wherein, said step a) further comprises receiving a common feedback signal set by said detection circuits, said common feedback signal set having two feedback signals, one feedback signal for each control signal of a control signal set, said generation of said plurality of detection signal sets in said step a) being further based on said common feedback signal set; and said step b) further comprises generating said common feedback signal set for said step a).

14. The method as set forth in claim 13 wherein, said two control signals of each of said plurality of control signal sets comprise a SET_in control signal, and a CLR_in control signal;

said two corresponding detection signals of each of said plurality of detection signal sets comprise a SET detection signal (SET_det), and a CLR detection signal (CLR_det);

said two output states of said output signal comprise an ON (logic one) state and an OFF (logic zero) state;

said two feedback signals of said common feedback signal set comprise a SET feedback signal (SET_sum_fb) and a CLR feedback signal (CLR_sum_fb); and said step a) comprises the steps of:
- a.1) setting a plurality of SET and CLR flip flops of said detection circuits with said SET_in and CLR_in signals respectively;
- a.2) outputting the set contents of said SET and CLR flips flops as said SET_det and CLR_det signals respectively; and
- a.3) generating a plurality of SET and CLR reset signals based on said SET_det and CLR_det signals and said common SET_sum_fb and CLR_sum_fb signals respectively after delaying for a predetermined amount of time, and resetting said SET and CLR flip flops with said SET and CLR reset signals respectively, said predetermined amount of time being sufficiently long to maintain a clock to clear time of said SET and CLR flip flops.

15. The method as set forth in claim 14, wherein, said generation of said SET and CLR reset signals in said step a.3) comprises the steps of:

- a.3.1) applying said predetermined amount of delay to said SET_det and CLR_det signals with a plurality of SET and CLR delay element series of said SET and CLR reset generation circuits respectively, and outputting the delayed SET_det and CLR_det signals; and a.3.2) generating said SET and CLR reset signals based on said delayed SET_det and CLR_det signals and said common SET_sum_fb and CLR_sum_fb signals with a plurality of SET and CLR gate assemblies of said detection circuits respectively.

16. The method as set forth in claim 15, wherein, said step a.3.2) comprises the steps of:

a.3.2.1) generating a plurality SET and CLR intermediate outputs based on said delayed SET_det and CLR_det signals and said common SET_sum_fb and CLR_sum_fb signals using a plurality SET and CLR AND gates of said SET and CLR gate assemblies respectively; and a.3.2.2) generating said SET and CLR reset signals based on said SET and CLR intermediate outputs and a common force reset control signals using a plurality of SET and CLR NOR gates of said SET and CLR gate assemblies respectively.

17. The method as set forth in claim 11, wherein, said step b) comprises the steps of:

b.1) receiving said plurality of detection signal sets, and generating a set of two summation signals summing said plurality of detection signal sets; and b.2) receiving said two summation signals, and generating said output signal based on the current state of said output signal and selected ones of said two summation signals that are applicable to the current state of said output signal using a resolution circuit.

18. The method as set forth in claim 17, wherein, said step b.1) further comprises generating a set of two feedback signals for said step b.2) using said gate assemblies, said generating of said detection signal in said step a) is further based on said set of two feedback signals.

19. The method as set forth in claim 18, wherein, said two control signals of each of said plurality of control signal sets comprise a SET_in control signal, and a CLR_in control signal;

said two corresponding detected signals of each of said plurality of detected signal sets comprise a SET detected signal (SET_det), and a CLR detected signal (CLR_det);

said two output states of said output signal comprise an ON (logic one) state and an OFF (logic zero) state;

said two summation signals comprise an uncomplemented SET summation signal (SET_sum) and a complemented CLR summation signal (CLR_sum_n);

said two feedback signals comprise a SET feedback signal (SET_sum_fb) and a CLR feedback signal (CLR_sum_fb), which are the sum of said SET_det and CLR_det signals;

said step b.1) comprises the steps of, b.1.1) receiving said plurality of SET_det and CLR_det signals, and generating said SET_sum and CLR_sum_n signals using a first SET OR gate and a CLR NOR gate respectively; and b.1.2) receiving said plurality of SET_det and CLR_det signals, and generating said SET_sum_fb and CLR_sum_fb signals using a second SET OR gate and a CLR OR gate respectively;

said step b.2) comprises the steps of receiving said SET_sum and CLR_sum_n signals, and generating said output signal based on the current state of said output signal and selected ones of said SET_sum and CLR_sum_n signals that are applicable to the current state of said output signal using a plurality of NAND gates.

20. The method as set forth in claim 19, wherein, said step b.2) comprises generating a logical one and a logical zero for the ON and OFF states of said output signal (RSLVD_out=1 and RSLVD_out=0) respectively using said plurality of NAND gates;

said plurality of NAND gates have an internal signal (SO);

said plurality of NAND gates collectively have four states governed by the current values of said output signal (RSLVD_out) and said internal signal (SO), said four states being {RSLVD_out =0, SO =0}, {RSLVD_out =0, SO =1 }, {RSLVD_out =1, SO =1}, and {RSLVD_out =1, SO =0};

said plurality of NAND gates determine the current values of RSLVD_out and SO in accordance to a first and a second boolean equation, said first boolean equation being $RSLVD\_out = SET\_sum * SO + SO * RSLVD\_out + CLR\_sum\_n * RSLVD\_out$, and said second boolean equation being $SO = CLR\_sum\_n * <RSLVD\_out> + SO * <RSLVD\_out> + SO * SET\_sum$, where $<RSLVD\_out>$ is the complement of the current value of said RSLVD_out signal.

21. In a digital system comprising a plurality of state machines asynchronously generating a plurality of control signal sets, each of said state machines generating at least one set of control signals and each of said control signal sets having two control signals, an apparatus for resolving said plurality of control signal sets into an output signal having two possible output states said apparatus comprising:

a) a plurality of detection circuits coupled to said state machines for receiving said plurality of control signal sets, detecting active control signals in said received plurality of control signal sets, and generating a plurality of detection signal sets corresponding to said control signal sets, each of said plurality of detection signal sets having two detection signals corresponding to the two control signals of one of said plurality of control signal sets for identifying active control signals being detected in the corresponding control signal set; and b) a resolution circuit coupled to said detection circuits and said state machines for receiving said plurality of detection signal sets, and generating said output signal based on the current state of said output signal and selected ones of said received detection signals that are applicable to the current state of said output signal.

22. The apparatus as set forth in claim 21, wherein, said detection circuits further receive a common feedback signal set from said resolution circuit, said common feedback signal set having two feedback signals, one feedback signal for each control signal of a control signal set;

said detection circuits further base said generation of said plurality of detection signal sets on said common feedback signal set.

23. The apparatus as set forth in claim 22, wherein, said two control signals of each of said plurality of control signal sets comprise a SET_in signal, and a CLR_in signal;

said two corresponding detection signals of each of said plurality of detection signal sets comprise a SET detection signal (SET_det), and a CLR detection signal (CLR_det);

said two output states of said output signal comprise an ON (logic one) state and an OFF (logic zero) state;

said two feedback signals of said common feedback signal set comprise a SET feedback signal (SET_sum_fb) and a CLR feedback signal (CLR_sum_fb); and each of said detection circuits comprises:
- a.1) a SET and a CLR flip flop coupled to one of said state machines and to said resolution circuit for respectively receiving a SET_in signal and a SET reset signal, and a CLR_in signal and a CLR reset signal as inputs, and generating a SET_det and a CLR_det signal based on the received inputs;
- a.2) a SET and a CLR reset generation circuit correspondingly coupled to said SET and CLR flip flops and to said resolution circuit for respectively receiving the SET_det signal and said common SET_sum_fb signal, and the CLR_det signal and said common CLR_sum_fb signal as inputs, and generating the SET and the CLR reset signals for said SET and CLR flip flops based on the received inputs after delaying a predetermined amount of time, said predetermined amount of time being sufficiently long to maintain a clock to clear time of said SET and CLR flip flops.

24. The apparatus as set forth in claim 23, wherein, said SET reset generation circuit of each of said detection circuits comprises:
- a.2.1.1) a series of SET delay elements coupled to the SET flip flop for receiving the SET_det signal, applying said predetermined amount of delay, and outputting a delayed SET det_signal; and
- a.2.1.2) a SET gate assembly coupled to said series of SET delay elements, the SET flip flop, and said resolution circuit for receiving the delayed SET_det signal and said common SET_sum_fb signal, and ,outputting the SET reset signal for the SET flip flop;

said CLR reset generation circuit of each of said detection circuits comprises:
- a.2.2.1) a series of CLR delay elements coupled to the CLR flip flop for receiving the CLR_det signal, applying said predetermined amount of delay, and outputting a delayed CLR_det signal; and
- a.2.2.2) a CLR gate assembly coupled to said :series of CLR delay elements, the CLR flip flop, and said resolution circuit for receiving the delayed CLR_det signal and said common CLR_sum_fb signal as inputs, and outputting the CLR reset signal for the CLR flip flop based on the received inputs.

25. The apparatus as set forth in claim 24, wherein, said SET gate assembly of said SET reset generation circuit of each of said detection circuits comprises:
- a.2.1.2.1) a SET AND gate coupled to said series of SET delay elements and said resolution circuit for receiving the delayed SET_det signal and said common SET_sum_fb signal as inputs, performing a logical AND operation on its inputs, and outputting the result of the logical AND operation as a SET intermediate output; and
- a.2.1.2.2) a SET NOR gate coupled to said SET AND gate for receiving the SET intermediate output and a force reset control signal as its inputs, performing a logical NOR operation on its inputs, and outputting the result of the logical NOR operation as the SET reset signal for the SET flip flop;

said CLR gate assembly of said CLR reset generation circuit of each of said detection circuits comprises:
- a.2.2.2.1) a CLR AND gate coupled to said series of CLR delay elements and said resolution circuit for receiving the delayed CLR_det signal and said common CLR_sum_fb signal as inputs, performing a logical AND operation on its inputs, and outputting the result of the logical AND operation as a CLR intermediate output; and
- a.2.2.2.2) a CLR NOR gate coupled to said CLR AND gate for receiving the CLR intermediate output and said force reset: control signal as its inputs, performing a logical NOR operation on its inputs, and outputting the result of the logical NOR operation as the CLR reset signal for the CLR flip flop.

26. The apparatus as set forth in claim 21, wherein, said resolution circuit comprises:
- b.1) a gate assembly coupled to said detection circuits for receiving said plurality of detection signal sets, and generating a set of two summation signals summing said plurality of detected signal sets; and
- b.2) a plurality of NAND gates coupled to said gate assembly and said state machines for receiving said two summation signals, and generating said output signal based on the current state of said output signal and selected ones of said two summation signals that are applicable to the current state of said output signal.

27. The method as set forth in claim 26, wherein, said gate assembly further generates a set of two feedback signals for said detection circuits, said detection circuits further based said generation of said detection signals on said set of two feedback signals.

28. The apparatus as set forth in claim 27, wherein, said two control signals of each of said plurality of control signal sets comprise a SET_in control signal, and a CLR_in control signal;

said two corresponding detection signals of each of said plurality of detection signal sets comprise a SET detection signal (SET_det), and a CLR detection signal (CLR_det);

said two output states of said output signal comprise an ON (logic one) state and an OFF (logic zero) state;

said two summation signals comprise an uncomplemented SET summation signal (SET_sum) and a complemented CLR summation signal (CLR_sum_n);

said two feedback signals comprise a SET feedback signal and a CLR feedback signal, which are the summation of said SET_det and CLR_det signals (SET_sum_fb and CLR_sum_fb);

said gate assembly comprises,
- b.1.1) a first SET OR gate and a CLR NOR gate coupled to said detection circuits and said resolution circuit for receiving said plurality of SET_det and CLR_det signals, performing a logical OR operation on said received SET_det signals, and a logical NOR operation on said CLR_det signals respectively, and generating the result of the logical OR operation as said SET_sum, and the result of the logical NOR operation as said CLR_sum_n signal respectively, and
- b.1.2) a second SET OR gate and a CLR OR gate coupled to said detection circuits and said resolution circuit for receiving said plurality of SET_det and CLR_det signals, performing logical OR operations on said received SET_det and CLR_det signals, and generating the results of the logical OR operations as said SET_sum_fb and CLR_sum_fb signals;

said NAND gates receive said SET_sum and CLR_sum_n signals, and generate said output signal based on the current state of said output signal and selected ones of said SET_sum and CLR_sum_n signals t_b_at are applicable to the current state; of said output signal.

29. The apparatus as set forth in claim 28, wherein, said output signal (RSLVD_out) being in the ON state when RSLVD_out=1 and in the OFF state when RSLVD_out=0;

said plurality of NAND gates have an internal signal (SO);

said plurality of NAND gates collectively have four states governed by the current values of said output signal (RSLVD_out) and said internal signal (SO), said four states being {RSLVD_out=0, SO =0}, {RSLVD_out= 0, SO=1 }, {RSLVD_out=1, SO=1 }, and {RSLVD_ out =1, SO =0};

said plurality of NAND gates determine the current values of RSLVD_out and SO in accordance to a first and a second boolean equation, said first boolean equation being $RSLVD\_out = SET\_sum * SO + SO * RSLVD\_out + CLR\_sum\_n * RSLVD\_out$, and said second boolean equation being $SO = CLR\_sum\_n * <RSLVD\_out> + SO * <RSLVD\_out> + SO * SET\_sum$, where $<RSLVD\_out>$ is the complement of the current value of said RSLVD_out signal.

* * * * *

UNITED STATES PATENT AND TRADEMARK OFFICE
CERTIFICATE OF CORRECTION

PATENT NO. : 5,579,349
DATED : November 26, 1996
INVENTOR(S) : Brady et al

It is certified that error appears in the above-indentified patent and that said Letters Patent is hereby corrected as shown below:

In column 3 at line 13 delete "tile" and insert --the--

In column 5 at line 56 delete "{0, 1,1}" and insert --{0,1}, {1,1}--

In column 7 at line 50 delete "predtermined" and insert --predetermined--

In column 7 at line 51 delete "maintaim" and insert --maintain--

In column 7 at line 52 delete "cleat" and insert --clear--

UNITED STATES PATENT AND TRADEMARK OFFICE
CERTIFICATE OF CORRECTION

PATENT NO. : 5,579,349
DATED : November 26, 1996
INVENTOR(S) : Brady et al

It is certified that error appears in the above-indentified patent and that said Letters Patent is hereby corrected as shown below:

In column 8 at line 24 delete "AND" and insert --NOR--

In column 8 at line 67 insert --said two output states of said output signal comprise an ON (logic one) state,-- following "(CLR_det); and prior to "and"

In column 9 at line 14 delete "SET_der" and insert --SET_det--

In column 15 at line 7 delete "t_b_at" and insert --that--

Signed and Sealed this

Fourth Day of March, 1997

*Attest:*

BRUCE LEHMAN

*Attesting Officer*     *Commissioner of Patents and Trademarks*